US012603001B2

(12) United States Patent
ALQawasmeh

(10) Patent No.: US 12,603,001 B2
(45) Date of Patent: Apr. 14, 2026

(54) DETECTING A NON-MARKED PARKING SPACE FOR A VEHICLE

(71) Applicant: Volvo Car Corporation, Gothenburg (SE)

(72) Inventor: Mohammad ALQawasmeh, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 149 days.

(21) Appl. No.: 18/428,343

(22) Filed: Jan. 31, 2024

(65) Prior Publication Data

US 2024/0274008 A1 Aug. 15, 2024

(30) Foreign Application Priority Data

Feb. 13, 2023 (EP) ..................................... 23156309

(51) Int. Cl.
  *G08G 1/14* (2006.01)
  *B60Q 9/00* (2006.01)
(52) U.S. Cl.
  CPC ............... *G08G 1/145* (2013.01); *B60Q 9/00* (2013.01)
(58) Field of Classification Search
  CPC .................................. G08G 1/145; B60Q 9/00
  USPC ...................................................... 340/932.2
  See application file for complete search history.

(56) References Cited

U.S. PATENT DOCUMENTS

| | | | |
|---|---|---|---|
| 2016/0075376 A1* | 3/2016 | Tomozawa ......... | B62D 15/0285 |
| | | | 340/932.2 |
| 2018/0029641 A1 | 2/2018 | Solar | |
| 2018/0165962 A1 | 6/2018 | Neystadt et al. | |
| 2019/0152450 A1* | 5/2019 | Weber ...................... | B60Q 9/00 |
| 2021/0241723 A1* | 8/2021 | Tucker ................. | G02B 27/017 |
| 2023/0206608 A1* | 6/2023 | Eldar ................... | G06V 20/588 |
| | | | 701/28 |

OTHER PUBLICATIONS

Extended European Search Report received for European Application Serial. No. 23156309.9 dated Jul. 4, 2023, 7 pages.

* cited by examiner

*Primary Examiner* — Kam Wan Ma
(74) *Attorney, Agent, or Firm* — Amin, Turocy & Watson, LLP

(57) ABSTRACT

The disclosure relates to a method for detecting a non-marked parking space for a vehicle on a roadway. The method can comprise receiving, by a system comprising a processor, infrastructure information describing an infrastructure feature defining a no-parking safety zone. The infrastructure information can comprise at least a location information describing a location of the infrastructure feature. The method can further comprise estimating, by the system, a distance between the location of the infrastructure feature and the vehicle based on the received location information. The method can further comprise informing, by the system, a user of the vehicle about the estimated distance.

20 Claims, 2 Drawing Sheets

DETECTING A NON-MARKED PARKING SPACE FOR A VEHICLE

CROSS-REFERENCE TO RELATED APPLICATIONS

This application claims the benefit of and priority to pending EP patent application serial number 23156309.9, filed Feb. 13, 2023, and entitled "METHOD FOR DETECTING A NON-MARKED PARKING SPACE FOR A VEHICLE, DATA PROCESSING APPARATUS, COMPUTER PROGRAM AND COMPUTER-READABLE STORAGE MEDIUM," the entirety of which is hereby incorporated by reference herein.

TECHNICAL FIELD

The present disclosure relates to vehicles and, more particularly, to detecting a non-marked parking space for a vehicle on a roadway.

BACKGROUND

In a traffic system, especially in an urban traffic system, it is important for general safety reasons that vehicles which are currently not in use are parked in a safe manner. In this context, for example, marked parking spaces can be considered as safe parking spaces. Among other things, this is due to the fact that marked parking spaces are usually chosen such that vehicles parked thereon are not hindering traffic circulation in adjacent areas of the roadway.

However, not all parking spaces are marked parking spaces and it may be generally allowable to park a vehicle in a non-marked parking space. In this context, it is the driver's responsibility to respect rules and laws relating to parking on non-marked parking spaces. On a more general level, the driver needs to make sure that the vehicle which is parking on a non-marked parking space is not hindering other traffic participants. This increases both the safety of the other traffic participants and the safety of the parked. However, making sure that the vehicle is not hindering other traffic participants and at the same time respecting relevant rules and laws puts a certain burden on the driver.

SUMMARY

The present disclosure relates to a method for detecting a non-marked parking space for a vehicle on a roadway. The present disclosure additionally is directed to a system. The present disclosure further relates to a non-transitory machine-readable medium.

It is an objective of the present disclosure to solve or at least alleviate above-described issues.

The problem is at least partially solved or alleviated by the subject matter of the independent claims of the present disclosure, wherein further examples are incorporated in the dependent claims.

According to a first aspect, there is provided a method for detecting a non-marked parking space for a vehicle on a roadway. The method comprises:

receiving an infrastructure information describing an infrastructure feature defining a no-parking safety zone, the infrastructure information comprising at least a location information describing a location of the infrastructure feature, estimating a distance between the location of the infrastructure feature and the vehicle based on the received location information, and informing a user of the vehicle about the estimated distance.

This method respects the fact that certain infrastructure features may define a no-parking safety zone. This means that within a certain distance from such infrastructure features, parking is not allowed. The infrastructure features defining such no-parking safety zones and the corresponding safety distances may be defined by law or other public regulations. For example, parking may be prohibited within a distance of 10 m from a pedestrian crossing or cycle crossing or a junction. According to the prior art, a driver of a vehicle who intends to park the vehicle on a non-marked parking space is obliged to know all infrastructure features defining a no-parking safety zone and the corresponding safety distances. Moreover, in prior art solutions, the driver needs to visually estimate a distance between the vehicle he or she is driving and the infrastructure feature. Using the present method takes off this burden from the driver. Using the method automatically provides an information to the driver indicating a distance between the infrastructure feature and the vehicle. This allows the driver to know whether the relevant safety distance is respected or not. This saves time and effort for the driver. Moreover, using the method is a lot more precise than visually estimating distances. A further effect of the enhanced precision is that non-marked parking space may be used in an efficient manner since a safety margin or estimation error with respect to the safety distance can be kept small. Altogether, road safety is enhanced for both a vehicle being parked on the non-marked parking space and other traffic participants traveling on roadway portions adjacent to the non-marked parking space.

In an example, the infrastructure information additionally comprises a safety distance information describing a safety distance defining the no-parking safety zone. Thus, in this example, the driver does not need to know the safety distance being associated with a specific infrastructure feature. This saves further time and effort for the driver.

It is noted that in the present method, estimating the distance between the location of the infrastructure feature and the vehicle is dynamic. This means that this estimation is regularly updated depending on a current position of the vehicle.

In an example, the infrastructure feature is at least one of a pedestrian crossing, a cycle crossing, a cycle passage, a cycle path, a pedestrian path, and a junction. Pedestrians and cyclists may be summarized as a vulnerable road users. It is, thus, important for other vehicles, especially cars, buses, and trucks, to keep a safety distance from roadway portions that are specifically dedicated to cyclists and pedestrians. This enhances road safety for vulnerable road users. The same applies to a junction. In the region of a junction, it is important for all traffic participants to have a good overview of the traffic situation. Using the present method, safety distances being associated with the above-mentioned infrastructure features may be easily respected.

In an example, the infrastructure information is provided by a navigation system of the vehicle. Alternatively, the infrastructure information is provided by a computer vision system of the vehicle comprising at least one camera unit being mounted on the vehicle. In other words, the infrastructure information forms part of a map information which is used by the navigation system. Alternatively, the computer vision system of the vehicle is configured to detect infrastructure features defining the no-parking safety zone. In this context, the computer vision system may be configured to detect at least one of a pedestrian crossing, a cycle crossing, a cycle passage, a cycle path, a pedestrian path, and a junction based on an image captured by the camera unit. In both alternatives, the infrastructure information is provided in an efficient and reliable manner.

In a further example, the infrastructure information is provided by a user input. This means that the driver can generate a user input if the vehicle is currently at a location corresponding to a location of an infrastructure feature defining a no-parking safety zone. The driver can for example push a button or make a speech command or a make gesture command if he or she visually detects such an infrastructure feature and is travelling approximately at the same location as the infrastructure feature. The user input starts a distance counter. Consequently, starting from the location at which the user input has been generated, the distance travelled is estimated using the present method. In this special case, the driver needs to know that the infrastructure feature defines a no-parking safety zone. Furthermore, in this example, the driver needs to know the safety distance information describing a safety distance defining the no-parking safety zone of this specific infrastructure feature. Thus, using the information on the estimated distance as provided by the present method helps the driver in that the driver may easily know when the vehicle has left the no-parking safety zone.

In an example, the method further comprises receiving a steering angle information and estimating the distance between the location of the infrastructure feature and the vehicle based on the received steering angle information. The steering angle of the vehicle provides an information on the traveling direction of the vehicle. The traveling direction has a direct influence on the distance between the location of the infrastructure feature and the vehicle. Thus, using the steering angle information allows to precisely estimate this distance.

In an example, the method further comprises receiving at least one of a vehicle location information and a vehicle speed information and estimating the distance between the location of the infrastructure feature and the vehicle based on the at least one of the received vehicle location information and the vehicle speed information. In this context, the vehicle speed integration may be integrated in order to estimate the distance. This integration may be calculated in a regular manner, for example every 100 milliseconds. Consequently, the distance between the location of the infrastructure feature and the vehicle can be calculated in a precise manner.

In an example, the method further comprises receiving an image captured by a camera unit installed on the vehicle and estimating the distance between the location of the infrastructure feature and the vehicle based on the received image. To this end, an image processing technique may be used. The camera unit installed on the vehicle may be a front camera or a rear camera. Also this alternative, the distance between the location of the infrastructure feature and the vehicle can be estimated in a precise manner.

In an example, informing the user about the estimated distance comprises displaying at least one of a number indicating the estimated distance, a number indicating a difference between the estimated distance and the safety distance, an image showing a space between the vehicle and the infrastructure feature, and an indicator informing the user about a relationship between the estimated distance and the safety distance. In this context, a number indicating a difference between the estimated distance and a distance threshold may be called a counter. The indicator may be a color indicator. In all of the examples, the driver is able to know whether the vehicle is located inside the no-parking safety zone or outside the no-parking safety zone. Consequently, the vehicle may be parked in a safe and precise manner.

In an example, informing the user about the estimated distance comprises triggering an acoustic signal. For example, a sound may be played if the estimated distance exceeds a predefined value such as the safety distance. Thus, the driver is informed about the fact whether the vehicle is located inside the no-parking safety zone or outside. Since this is done in an acoustic manner, the driver may perceive this information independent from a direction in which the driver is looking.

In an example, the method further comprises triggering a light projection indicating the safety distance. In other words, the light projection indicates a location of the no-parking safety zone. Thus, it is simple for the driver to determine whether he or she has reached and allowable non-marked parking space, i.e. a parking space outside the no-parking safety zone.

In an example, the light projection is only used in connection with forward parking. When forward parking, a light projection is easily visible by a driver.

In another example, the light projection is only used if a surrounding lightness is below a predefined lightness threshold. In simplified words, the light projection is only used if the vehicle is located in an environment which is sufficiently dark. This enhances the visibility of the light projection.

In an example, the method further comprises receiving at least one of a user input starting information and a gear status information and triggering the start of the method based on the at least one of the user input starting information and the gear status information. In other words, the method may be started by a user input. In this context, the user may for example press a button. Alternatively, the method may be started once the drive gear or the reverse gear is engaged. In the latter alternative, engaging the reverse gear or the drive gear is seen as an indicator that the driver intends to start a parking maneuver.

In an example, the method further comprises receiving at least one of a user input abandoning information, a vehicle parking status information and a vehicle speed information exceeding a speed threshold and abandoning the method based on the at least one of the user input abandoning information, the vehicle parking status information, and the vehicle speed information. Thus, the method may be abandoned based on a corresponding user input. Additionally, or alternatively, the method may be abandoned if the vehicle is found to have parked. In a further alternative, the method is abandoned if the vehicle travels at a speed exceeding a predefined speed threshold. In all of these examples, the execution of the method is not necessary anymore.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a data processing apparatus comprising means for carrying out the method of the present disclosure. Thus, the fact that certain infrastructure features may define a no-parking safety zone may be respected. This means that within a certain distance from such infrastructure features, parking may not be allowed. According to the prior art, a driver of a vehicle who intends to park the vehicle on a non-marked parking space is obliged to know all infrastructure features defining a no-parking safety zone and the corresponding safety distances, using the present data processing apparatus takes off this burden from the driver. Using the data processing apparatus automatically provides an information to the driver by which the driver can easily know whether the relevant safety distance is respected or not. This saves time and effort for the driver. Moreover, using the data processing apparatus is a lot more precise than visually estimating distances. A further effect of the enhanced precision is that non-marked parking space may be used in a more efficient manner since a safety margin or estimation error with respect to the safety distance can be kept small. Altogether, road safety is enhanced for both a vehicle being parked on the non-marked parking space and other traffic participants traveling on roadway portions adjacent to the non-marked parking space.

According to a third aspect, there is provided a computer program comprising instructions which, when the program is executed by a computer, cause the computer to carry out the method of the present disclosure. Thus, the fact that certain infrastructure features may define a no-parking safety zone may be respected. This means that within a certain distance from such infrastructure features, parking may not be allowed. According to the prior art, a driver of a vehicle who intends to park the vehicle on a non-marked parking space is obliged to know all infrastructure features defining in no-parking safety zone and the corresponding safety distances. Using the present computer program takes off this burden from the driver. Using the computer program automatically provides an information to the driver by which the driver can easily know whether the relevant safety distance is respected or not. This saves time and effort for the driver. Moreover, using the computer program is a lot more precise than visually estimating distances. A further effect of the enhanced precision is that non-marked parking space may be used in a more efficient manner since a safety margin or estimation error with respect to the safety distance can be kept small. Altogether, road safety is enhanced for both a vehicle being parked on the non-marked parking space and other traffic participants traveling on roadway portions adjacent to the non-marked parking space.

According to a fourth aspect, there is provided a computer-readable storage medium comprising instructions which, when executed by a computer, cause the computer to carry out the method of the present disclosure. Thus, the fact that certain infrastructure features may define a no-parking safety zone may be respected. This means that within a certain distance from such infrastructure features, parking may not be allowed. According to the prior art, a driver of a vehicle who intends to park the vehicle on a non-marked parking space is obliged to know all infrastructure features defining a no-parking safety zone and the corresponding safety distances. Using the present computer-readable storage medium takes off this burden from the driver. Using the computer-readable storage medium automatically provides an information to the driver by which the driver can easily know whether the relevant safety distance is respected or not. This saves time and effort for the driver. Moreover, using the computer-readable storage medium is a lot more precise than visually estimating distances. A further effect of the enhanced precision is that non-marked parking space may be used in a more efficient manner since a safety margin or estimation error with respect to the safety distance can be kept small. Altogether, road safety is enhanced for both a vehicle being parked on the non-marked parking space and other traffic participants traveling on roadway portions adjacent to the non-marked parking space.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The Figures are merely schematic representations and serve only to illustrate examples of the disclosure. Identical or equivalent elements are in principle provided with the same reference signs.

Figure 1:
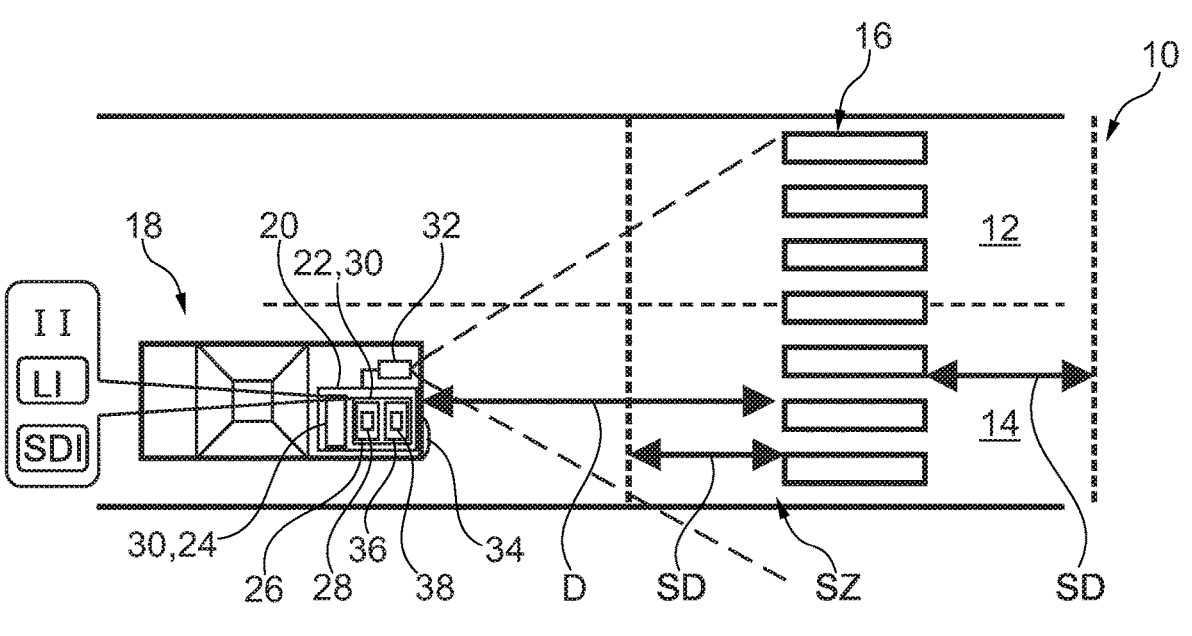
FIG. 1 shows a traffic situation comprising a vehicle with a system or data processing apparatus according to the present disclosure and a non-transitory machine-readable medium according to the present disclosure, wherein the system or data processing apparatus comprises means for carrying out the method for detecting a non-marked parking space of the present disclosure.

FIG. 1 shows a traffic situation.

The traffic situation comprises a roadway 10 with two lanes 12, 14.

A pedestrian crossing 16 is crossing the roadway 10. In the present example, the pedestrian crossing 16 is represented as a zebra crossing. It is understood that the pedestrian crossing 16 can be of any other type of a pedestrian crossing.

Moreover, a vehicle 18 is traveling on the roadway 10.

The vehicle 18 comprises a data processing apparatus 20.

The data processing apparatus 20 comprises a data storage unit 22 and a data processing unit 24.

The data storage unit 22 further comprises a computer-readable storage medium 26.

On the computer-readable storage medium 26, there is provided a computer program 28.

Both the computer-readable storage medium 26 and the computer program 28 comprise instructions which, when executed by the data processing unit 24 or, more generally speaking, a computer, cause the data processing unit 24 or the computer to carry out a method for detecting a non-marked parking space for the vehicle 18.

Consequently, the data storage unit 22 and the data processing unit 24 may be considered as means 30 for carrying out the method for detecting a non-marked parking space for the vehicle 18.

The vehicle 18 additionally comprises a camera unit 32 which is communicatively connected to the data processing apparatus 20.

Moreover, the vehicle 18 comprises a light projection unit 34 which also is communicatively connected to the data processing apparatus 20.

For the present explanations, it is assumed that for the roadway 10 and the vehicle 18 traveling thereon, legislation defines a no-parking safety zone SZ around pedestrian crossings 16. The no-parking safety zone SZ may be defined by a safety distance SD around the pedestrian crossing 16. The safety distance SD is for example 10 m. This means that it is not allowed to park a vehicle within a range of 10 m around the pedestrian crossing 16.

In the following, the method for detecting a non-marked parking space for the vehicle 18 is explained.

In the present example, the execution of this method is triggered in that a user input starting information is received at the data processing apparatus 20.

Figure 3:
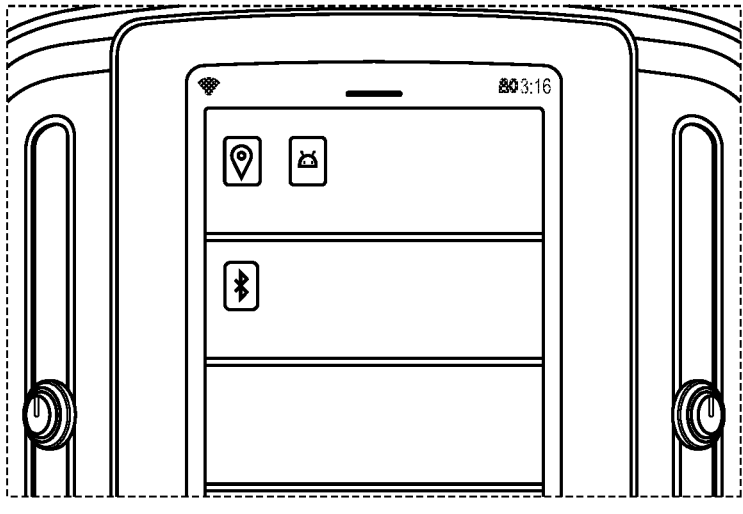
FIG. 3 shows a central screen of the vehicles of FIGS. 1 and 2.

The user input starting information may be generated by the user pushing a button on a touchscreen which is associated with the execution of the present method. In the example of FIG. 3, the user input starting information may be generated by pressing the right button in the top row.

The user of the vehicle 18 presses this button if he or she intends to park the vehicle 18 in a non-marked parking space.

In a first step S1 of the method, an infrastructure information II is received.

This infrastructure information II describes an infrastructure feature, in the present case the pedestrian crossing 16 defining the no-parking safety zone SZ. In this context, the infrastructure information II comprises at least a location information LI describing a location of the infrastructure feature, i.e. of the pedestrian crossing 16, and a safety distance information SDI describing a safety distance defining the no-parking safety zone SZ. As has been explained before, the safety distance is assumed to be 10 m in the present example.

In the present example, the infrastructure information II is provided by a computer vision system of the vehicle comprising the camera unit 32. This means that the camera unit 32 captures images of the surroundings of the vehicle 18. These images are analyzed by an infrastructure feature recognition method being carried out by the data processing apparatus 20. This means that the date the storage unit 22 comprises another computer-readable storage medium 36 on which a further computer program 38 is provided. Both the further computer-readable storage medium 36 and the further computer program 38 comprise instructions which, when executed by the data processing unit 24 or, more generally speaking, a computer, cause the computer to carry out the method for detecting an infrastructure feature in an image received from the camera unit 34.

The camera unit 32, the further computer-readable storage medium 36 and the further computer-program 38 form part of the computer vision system.

The method for detecting the infrastructure feature in an image received from the camera unit 32 is also configured to provide a corresponding location information LI. Moreover, the further computer-readable storage medium 36 comprises a list of safety distances for a plurality of relevant infrastructure features.

Thus, based on an image captured by the camera unit 32, a type of an infrastructure feature may be determined and a safety distance may be associated to the determined infrastructure feature. Consequently, the associated no-parking safety zone SZ is fully defined.

In a subsequent second step, a distance D between the location of the infrastructure feature and the vehicle 18 is estimated.

To this end, the received location information LI of the infrastructure feature is used.

Moreover, a vehicle location information, a vehicle speed information and a steering angle information are received.

Based on this information, the distance between the location of the infrastructure feature and the vehicle 18 may be reliably estimated. More precisely, starting from the vehicle location information, the vehicle speed information is regularly integrated. Moreover, the steering angle information gives an indication of the traveling direction of the vehicle 18.

It is noted that in an alternative, the distance between the vehicle 18 and the infrastructure feature, i.e. the pedestrian crossing 16 may be estimated based on the received image as captured by the camera unit 32.

Altogether, a distance D between the location of the infrastructure feature and the vehicle 18 is known.

Thereafter, in a third step, the user of the vehicle 18 is informed about the estimated distance D. This offers the possibility to compare this distance to the safety distance SD.

Figure 4:
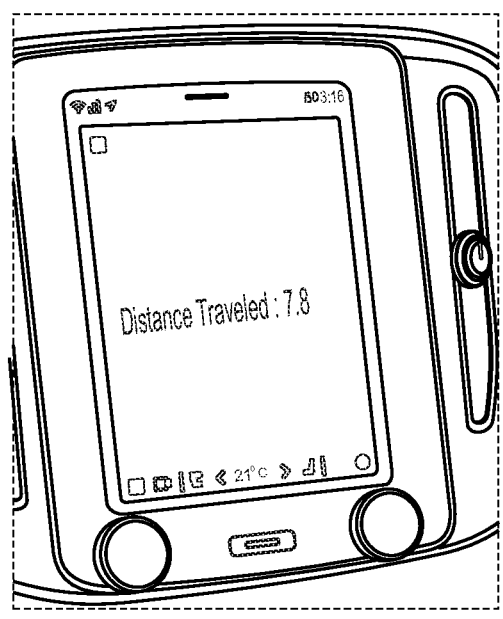
FIG. 4 shows an information for a user of the vehicles of FIGS. 1 and 2 being displayed on the central screen.

In this context, a number indicating the estimated distance may be displayed on a central screen within the vehicle (cf. FIG. 4). Additionally, a color indicator may be used for informing the user about a relationship between the estimated distance D and the safety distance SD.

In the present example, the distance being displayed on the central screen is presented in red color as long as the estimated distance D is smaller than the relevant safety distance SD.

In case the estimated distance D exceeds the relevant safety distance SD, the displayed distance is represented in green color.

Consequently, the driver knows exactly when the vehicle 18 has left the no-parking safety zone SZ and, thus, can park the vehicle 18 in a safe and allowable manner.

It is understood that also other manners of informing the user about the estimated distance D are possible. For example, instead of the number indicating the estimated distance D, a number indicating a difference between the estimated distance D and the safety distance SD may be displayed on the central screen.

Optionally, an image showing a space between the vehicle 18 and the infrastructure feature, i.e. the pedestrian crossing 16 may be added.

It is also possible to inform the user about the estimated distance D by triggering an acoustic signal. For example, a sound may be played if the vehicle leaves the no-parking safety zone SZ.

Additionally, in the present example, the vehicle 18 comprises a light projection unit 34. Using the light projection unit 34, a light pattern is projected on the roadway 10 such that the light pattern indicates a location of the no-parking safety zone SZ. Thus, the driver can easily see where it is allowed to park the vehicle 18 and where not.

In the present example, the method is abandoned once the vehicle 18 has terminated the parking maneuver.

In this context, a vehicle parking status information may be received at the data processing apparatus 20. The vehicle parking status information may be provided by a gearbox of the vehicle, e.g. if the gearbox is put into state "P".

Alternatively, the method may be abandoned following a user action, e.g. by the user pushing a button. The button will generate a user input abandoning information which is provided to the data processing apparatus 20.

Figure 2:
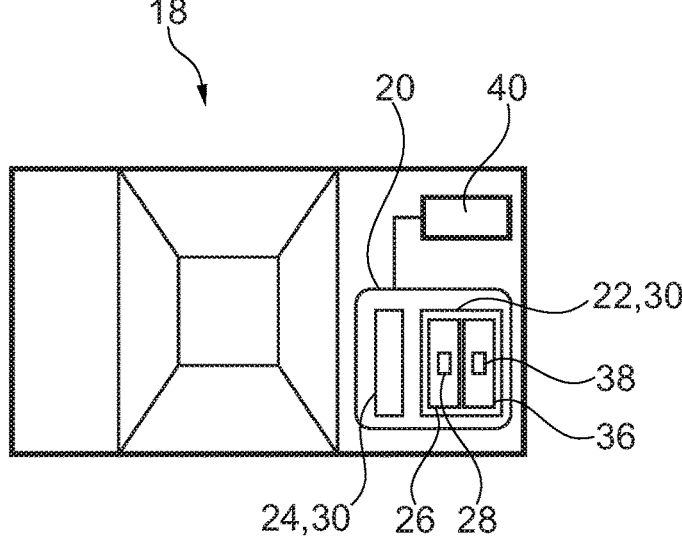
FIG. 2 shows a vehicle according to another example.

FIG. 2 shows a vehicle 18 according to another example. The vehicle 18 of FIG. 2 may replace the vehicle 18 of FIG. 1. In the following, only the differences between the vehicle 18 of FIG. 1 in the vehicle 18 of FIG. 2 will be explained.

The vehicle 18 of FIG. 2 does not comprise a camera unit. Instead, the vehicle 18 is equipped with the navigation system 40.

On the navigation system 40, there is stored a map information comprising a representation of the roadway 10 and the pedestrian crossing 16. Also, an information on a safety distance SD associated with the pedestrian crossing 16 is provided on the navigation system 40. Thus, in contrast to the example of FIG. 1, the infrastructure information II is provided by the navigation system 40.

Even though the above examples have been explained in connection with an infrastructure feature being a pedestrian crossing, it is understood that the same method may be executed in connection with other infrastructure features. This may be the case for a cycle crossing, a cycle passage, a cycle path, a pedestrian path, and a junction. The above explanations apply mutatis mutandis to an execution of the method in connection with these infrastructure features.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS

10 roadway
12 lane
14 lane
16 pedestrian crossing
18 vehicle
20 data processing apparatus
22 data storage unit
24 data processing unit
26 computer-readable storage medium
28 computer program
30 means for carrying out a method for detecting a non-marked parking space for a vehicle
32 camera unit
34 light projection unit
36 further computer-readable storage medium
38 further computer program
40 navigation system
D distance between the vehicle and the infrastructure feature
II infrastructure information
LI location information SDI safety distance information
SZ no-parking safety zone
SD safety distance

What is claimed is:

1. A method for assisting parking of a vehicle on a portion of a roadway that does not have marked parking spaces, wherein the parking is allowed on the portion of the roadway, the method comprising:

receiving, by a system comprising a processor, infrastructure information that:

describes an infrastructure feature on the roadway, wherein the infrastructure feature is adjacent to the portion of the roadway, defines a safety zone around the infrastructure feature where vehicles are not permitted to park, describes a location of the infrastructure feature, and a safety distance from the infrastructure feature, wherein the safety distance defines an outer boundary of the safety zone, and wherein the safety zone is not marked on the roadway;

determining, by the system, using a sensor, an estimated distance between the location of the infrastructure feature and a portion of the vehicle that is performing a parking maneuver to park the vehicle on the roadway, wherein the portion of the vehicle is a closest portion of the vehicle to the infrastructure feature; and presenting, by the system, a notification to a driver of the vehicle about the estimated distance.

2. The method of claim 1, wherein the infrastructure feature comprises at least one of a pedestrian crossing, a cycle crossing, a cycle passage, a cycle path, a pedestrian path, or a junction.

3. The method of claim 1, wherein the infrastructure information is provided by at least one of a navigation system of the vehicle, a computer vision system of the vehicle comprising at least one camera unit mounted on the vehicle, or a user input.

4. The method of claim 1, further comprising:

receiving, by the system, steering angle information; and determining, by the system, the estimated distance based further on the received steering angle information.

5. The method of claim 1, further comprising:

receiving, by the system, at least one of a vehicle location information or a vehicle speed information; and determining, by the system, the estimated distance based further on the at least one of the received vehicle location information or the vehicle speed information.

6. The method of claim 1, further comprising:

receiving, by the system, an image captured by the sensor; and determining, by the system, the estimated distance based on the received image.

7. The method of claim 1, wherein presenting the notification comprises displaying, on a display device, at least one of a number indicating the estimated distance, a number indicating a difference between the estimated distance and the safety distance, an image showing a space between the vehicle and the infrastructure feature, or an indicator informing the driver about a relationship between the estimated distance and the safety distance.

8. The method of claim 1, wherein presenting the notification comprises triggering an acoustic signal.

9. The method of claim 1, further comprising:

projecting, by the system, a light pattern on the roadway that indicates the safety zone.

10. The method of claim 1, further comprising:

receiving, by the system, at least one of a user input starting information or a gear status information; and triggering, by the system, the method based on the at least one of the user input starting information or the gear status information.

11. The method of claim 1, further comprising:

receiving, by the system, at least one of a user input abandoning information, a vehicle parking status information, or a vehicle speed information exceeding a speed threshold; and abandoning, by the system, the method based on the at least one of the user input abandoning information, the vehicle parking status information, or the vehicle speed information.

12. A system, comprising:

a processor; and a memory that stores executable instructions that, when executed by the processor, facilitate performance of operations for assisting parking of a vehicle on a portion of a roadway that does not have marked parking spaces, wherein the parking is allowed on the portion of the roadway, the operations comprising:

receiving infrastructure information that:

describes an infrastructure feature on the roadway, wherein the infrastructure feature is adjacent to the portion of the roadway, defines a safety zone around the infrastructure feature where vehicles are not permitted to park, describes a location of the infrastructure feature, and a safety distance from the infrastructure feature, wherein the safety distance defines an outer boundary of the safety zone, and wherein the safety zone is not marked on the roadway;

determining, using a sensor, an estimated distance between the location of the infrastructure feature and a portion of the vehicle that is performing a parking maneuver to park the vehicle on the roadway, wherein the portion of the vehicle is a closest portion of the vehicle to the infrastructure feature; and presenting a notification to a driver of the vehicle about the estimated distance.

13. The system of claim 12, wherein the infrastructure feature comprises at least one of a pedestrian crossing, a cycle crossing, a cycle passage, a cycle path, a pedestrian path, or a junction.

14. The system of claim 12, wherein the infrastructure information is provided by at least one of a navigation system of the vehicle, a computer vision system of the vehicle comprising at least one camera unit mounted on the vehicle, or a user input.

15. The system of claim 12, wherein the operations further comprise:

receiving steering angle information; and determining the estimated distance based further on the received steering angle information.

16. The system of claim 12, further comprising:

receiving at least one of a vehicle location information or a vehicle speed information; and determining the estimated distance based further on the at least one of the received vehicle location information or the vehicle speed information.

17. A non-transitory machine-readable medium, comprising executable instructions that, when executed by a processor, facilitate performance of operations for assisting parking of a vehicle on a portion of a roadway that does not have marked parking spaces, wherein the parking is allowed on the portion of the roadway, the operations comprising:

receiving infrastructure information that:

describes an infrastructure feature on the roadway, wherein the infrastructure feature is adjacent to the portion of the roadway, defines a safety zone around the infrastructure feature where vehicles are not permitted to park, describes a location of the infrastructure feature, and a safety distance from the infrastructure feature, wherein the safety distance defines an outer boundary of the safety zone, and wherein the safety zone is not marked on the roadway;

determining, using a sensor, an estimated distance between the location of the infrastructure feature and a portion of the vehicle that is performing a parking maneuver to park the vehicle on the roadway, wherein the portion of the vehicle is a closest portion of the vehicle to the infrastructure feature; and presenting a notification to a driver of the vehicle about the estimated distance.

18. The non-transitory machine-readable medium of claim 17, wherein the operations further comprise:

receiving an image captured by the sensor; and determining the estimated distance based on the received image.

19. The non-transitory machine-readable medium of claim 17, wherein presenting the notification comprises displaying, on a display device, at least one of a number indicating the estimated distance, a number indicating a difference between the estimated distance and the safety distance, an image showing a space between the vehicle and the infrastructure feature, or an indicator informing the driver about a relationship between the estimated distance and the safety distance.

20. The non-transitory machine-readable medium of claim 17, wherein presenting the notification comprises triggering an acoustic signal.

* * * * *